Patented Mar. 30, 1948

2,438,881

UNITED STATES PATENT OFFICE 2,438,881

PROCESS OF EPIMERIZING CALCIUM d-ARABONATE

Leo H. Sternbach, Montclair, N. J., assignor to Hoffmann-La Roche Inc., Nutley, N. J., a corporation of New Jersey No Drawing. Application February 12, 1946, Serial No. 647,199

5 Claims. (Cl. 260—344)

This invention relates to the synthesis of d-ribonic acid and d-ribonolactone. d-Ribonolactone is an important intermediate in the manufacture of riboflavin.

In general, my new process involves the epimerization of calcium-d-arabonate. Heretofore, the epimerization of arabonic acid has been achieved by heating a mixture of arabonic acid and pyridine. Since arabonic acid is normally available in the form of its calcium salt, it has been customary to prepare free arabonic acid by removal of the calcium, for example, as calcium oxalate, from a solution of calcium arabonate. By separation of the precipitate, and epimerization of the arabonic acid by heating in the presence of pyridine, a mixture was obtained which contained arabonic acid and ribonic acid. The two epimers present in this reaction mixture were then separated in the form of their calcium salts, these salts being obtained by treatment with excess calcium carbonate. This procedure is undesirable since the pyridine present in the reaction mixture, as well as the excess calcium carbonate, have to be removed prior to the concentration step which is ultimately necessary for the final separation of the epimers.

I have now discovered that calcium-d-arabonate can be epimerized directly by heating this salt in an aqueous solution. The epimerization takes place not only in alkaline, but also in neutral, and even slightly acidic, media.

According to my invention, an aqueous solution of calcium arabonate is epimerized by heating at a temperature, which may range from about 90° to about 160° C. My preferred range is 120–140°. The resulting mixture contains calcium arabonate and calcium ribonate. The arabonate is removed. The mother liquors of the calcium arabonate, containing the calcium ribonate formed during the epimerization, are freed from the calcium ions present, filtered, and concentrated. The concentrate is then held for about 5–10 days during which time lactonization occurs. The solution is then concentrated further to a viscous sirup, which is treated to recover d-ribonolactone.

The isolation of pure d-ribonolactone from this composition can be done by several methods, one of which is known in the prior art, and involves the use of cadmium hydroxide and hydrogen sulfide.

However, I have developed a novel and simple method of isolating the d-ribonolactone. This procedure involves the treatment of the crude ribonolactone containing composition, with a solvent for the lactone, such as methanol, ethanol, or acetone, whereby a solution is effected. This solution is then treated with a second solvent which has a lower solvent action on the lactone than does the solvent initially employed to effect the solution. Suitable materials are, for example, propanol and butanol. Thereafter, the initial solvent, such as methanol, ethanol, or acetone, as the case may be, is completely distilled away. To insure such complete distillation, I have found it desirable to continue the distillation until a part of the second solvent, for example, the butanol, distills off. The residual solution is then seeded with d-ribono-lactone, whereby crystalline d-ribono-lactone is separated. This lactone may then be filtered, and washed, for example, with butanol.

The significance of the invention will be made apparent by the following illustrative examples:

Example 1

A mixture of 500 g. of calcium-d-arabonate and 1000 g. distilled water is heated for 3½ hours in an autoclave at 130–140°. The hot solution is decolorized with 25 g. of activated charcoal, filtered and left for 15 hours at 0° C. The crystalline precipitate of calcium-arabonate is filtered off and washed with water. The solution is concentrated in water pump vacuo to 260 g., seeded with calcium-arabonate and left for about three days at 0° C.; a second crop of calcium-arabonate is filtered off. The filtrate is diluted to 400 g., freed from calcium-ions with 38 g. oxalic acid, filtered and concentrated in water pump vacuo to 210 g. After 5–10 days, the solution is concentrated in water pump vacuo to a viscous sirup (about 90 g.). This sirup is dissolved in 50 g. methanol, and 350 g. n-butanol are then added. All the methanol and a small part of the butanol are distilled off. The residual solution (350 g.) is seeded with d-ribono-lactone and left at room temperature for a few hours. After 6–14 hours, after a substantial amount of crystals has deposited, the solution is concentrated in water pump vacuo at a bath temperature of 45° to 120–140 g. The mixture is left for a few hours at room temperature and then cooled for two days at 0° C. The precipitated crystalline d-ribono-lactone is filtered off and washed with butanol.

Example 2

A mixture of 500 g. calcium-d-arabonate and 1000 g. distilled water is heated for 3½ hours in an autoclave at 130–140°. The hot solution is decolorized with 25 g. activated charcoal, filtered and left for 15 hours at 0° C. The crystalline precipitate of calcium-arabonate is filtered off and washed with water. The solution is concentrated in water pump vacuo to 260 g., seeded with calcium-arabonate and left for about three days at 0° C. A second crop of calcium-arabonate is filtered off. The filtrate is diluted to 400 g., freed from calcium-ions with 38 g. oxalic acid, filtered and concentrated in water pump vacuo to 210 g. After 5–10 days, the solution is concentrated in water pump vacuo to a viscous sirup (about 90 g.). This sirup is dissolved in 50 g. acetone, and 350 g. n-butanol are then added. All the acetone and a small part of the butanol are distilled off. The residual solution (350 g.) is seeded with d-ribono-lactone and left at room temperature for a few hours. After 6–14 hours, after a substantial amount of crystals has deposited, the solution is concentrated in water pump vacuo at a bath temperature of 45° to 120–140 g. The mixture is left for a few hours at room temperature and then cooled for two days at 0° C. The precipitated crystalline d-ribono-lactone is filtered off and washed with butanol.

*Example 3*

A mixture of 500 g. calcium-d-arabonate, 5–40 g. calcium hydroxide, and 1000 g. distilled water is heated for 2½ hours in an autoclave at 130–140°. The hot solution is neutralized with carbon dioxide, decolorized with 25 g. activated charcoal, filtered and left for 15 hours at 0° C. The crystalline precipitate of calcium-arabonate is filtered off and washed with water. The solution is concentrated in water pump vacuo to 260 g., seeded with calcium-arabonate, and left for about three days at 0° C. A second crop of calcium-arabonate is filtered off. The filtrate is diluted to 400 g., freed from calcium-ions with 42 g. oxalic acid, filtered and concentrated in water pump vacuo to 210 g. After 5–10 days the solution is concentrated in water pump vacuo to a viscous sirup (about 90 g.). This sirup is dissolved in 40 parts methanol, and 350 g. n-butanol are then added. The methanol and a small part of the butanol are distilled off. The residual solution (350 g.) is seeded with d-ribono-lactone and left at room temperature for a few hours. After 6–14 hours, after a substantial amount of crystals has deposited, the solution is concentrated in water pump vacuo at a bath temperature of 45° to 120–140 g. The mixture is left for a few hours at room temperature and then cooled for 2 days at 0° C. The precipitated crystalline d-ribono-lactone is filtered off and washed with butanol.

*Example 4*

A mixture of 500 g. calcium-d-arabonate, 5–40 g. calcium hydroxide, and 1000 g. distilled water is heated for 2½ hours in an autoclave at 130–140°. The hot solution is neutralized with carbon dioxide, decolorized with 25 g. activated charcoal, filtered and left for 15 hours at 0° C. The crystalline precipitate of calcium-arabonate is filtered off and washed with water. The solution is concentrated in water pump vacuo to 260 g., seeded with calcium-arabonate, and left for about three days at 0° C. A second crop of calcium-arabonate is filtered off. The filtrate is diluted to 400 g., freed from calcium-ions with 42 g. oxalic acid, filtered and concentrated in water pump vacuo to 210 g. After 5–10 days the solution is concentrated in water pump vacuo to a viscous sirup (about 90 g.). This sirup is dissolved in 40 grams acetone, and 350 g. n-butanol are then added. The acetone and a small part of the butanol are distilled off. The residual solution (350 g.) is seeded with d-ribono-lactone and left at room temperature for a few hours. After 6–14 hours, after a substantial amount of crystals has deposited, the solution is concentrated in water pump vacuo at a bath temperature of 45° to 120–140 g. The mixture is left for a few hours at room temperature and then cooled for two days at 0° C. The precipitated crystalline d-ribono-lactone is filtered off and washed with butanol.

I claim:

1. Process of epimerizing calcium d-arabonate, which comprises heating an aqueous solution of that salt for a sufficient length of time to effect epimerization.

2. The process of claim 1 in which the epimerization is carried out at about 90 to 160° C.

3. The process of claim 1 in which the epimerization is carried out at about 120–140° C.

4. The process of claim 1 in which the epimerizing takes place in a substantially neutral solution.

5. The process of claim 1 in which the epimerizing takes place in an alkaline solution.

LEO H. STERNBACH.

REFERENCES CITED

The following references are of record in the file of this patent:

Chemical Abstracts, vol. 30 (1936), page 4469. (Copy in Scientific Library.)